(12) United States Patent
Sakai

(10) Patent No.: US 9,175,455 B2
(45) Date of Patent: Nov. 3, 2015

(54) BULLDOZER

(71) Applicant: KOMATSU LTD., Tokyo (JP)

(72) Inventor: Kiyotaka Sakai, Kaga (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 14/370,635

(22) PCT Filed: Apr. 26, 2013

(86) PCT No.: PCT/JP2013/062477
§ 371 (c)(1),
(2) Date: Jul. 3, 2014

(87) PCT Pub. No.: WO2014/174684
PCT Pub. Date: Oct. 30, 2014

(65) Prior Publication Data
US 2015/0275476 A1 Oct. 1, 2015

(51) Int. Cl.
*B60K 13/04* (2006.01)
*E02F 9/08* (2006.01)
(Continued)

(52) U.S. Cl.
CPC ............ *E02F 9/0866* (2013.01); *F01N 13/009* (2014.06); *F01N 13/1805* (2013.01); *F01N 2340/04* (2013.01); *F01N 2590/08* (2013.01)

(58) Field of Classification Search
CPC ...... B60K 13/04; E02F 9/0883; E02F 9/0866; F01N 3/00; F01N 3/2066; F01N 3/021; F01N 2250/02; F01N 2590/08; F01N 13/009; F01N 13/1805; F16M 13/02; F16M 13/00; F16M 11/00

USPC ............ 180/309, 89.2, 311, 296; 60/295, 297; 248/637, 678, 676, 677, 671
See application file for complete search history.

(56) References Cited

U.S. PATENT DOCUMENTS 7,401,673 B2 * 7/2008 Fukazawa et al. .......... 180/89.12
7,717,205 B2 * 5/2010 Kertz et al. .................. 180/68.3
(Continued)

FOREIGN PATENT DOCUMENTS

JP 2005-113674 A 4/2005
JP 2008-240695 A 10/2008
(Continued)

OTHER PUBLICATIONS

The International Search Report for the corresponding international application No. PCT/JP2013/062477, issued on Jul. 11, 2013.
(Continued)

*Primary Examiner* — James M Dolak
(74) *Attorney, Agent, or Firm* — Global IP Counselors, LLP

(57) ABSTRACT

A bulldozer includes a blade, an engine, a first exhaust treatment device, a second exhaust treatment device, a relay connection pipe, and an engine cover. The first exhaust treatment device is disposed in front of the engine and lower than the upper surface thereof. The second exhaust treatment device is disposed above the first exhaust treatment device. The relay connection pipe is disposed above the first exhaust treatment device and below the second exhaust treatment device. The longitudinal directions of the first and second exhaust treatment devices extend along the vehicle lateral direction. As seen from the top of the vehicle, the second exhaust treatment device overlaps at least a part of the first exhaust treatment device. As seen from the side of the vehicle, the front edge of the first exhaust treatment device is positioned forward of the front edge of the second exhaust treatment device.

14 Claims, 7 Drawing Sheets

(51) Int. Cl.
*F01N 13/00* (2010.01)
*F01N 13/18* (2010.01)

(56) References Cited

U.S. PATENT DOCUMENTS

| | | | |
|---|---|---|---|
| 8,141,535 B2 | 3/2012 | Olsen et al. | |
| 8,505,661 B2 * | 8/2013 | Tsuji et al. | 180/68.4 |
| 8,720,638 B1 * | 5/2014 | Nakagami et al. | 180/309 |
| 8,827,029 B1 * | 9/2014 | Nakagami et al. | 180/309 |
| 8,833,500 B2 * | 9/2014 | Nakamura et al. | 180/69.2 |
| 8,857,557 B2 * | 10/2014 | Sakamoto | 180/309 |
| 8,931,585 B2 * | 1/2015 | Sakai et al. | 180/291 |
| 8,950,535 B2 * | 2/2015 | Harada et al. | 180/68.4 |
| 8,973,692 B1 * | 3/2015 | Okuda et al. | 180/68.5 |
| 8,973,976 B2 * | 3/2015 | Nakagami et al. | 296/190.01 |
| 9,010,480 B2 * | 4/2015 | Sakai et al. | 180/309 |
| 2013/0001005 A1 | 1/2013 | Nakamura et al. | |

FOREIGN PATENT DOCUMENTS

| | | |
|---|---|---|
| JP | 2009-103016 A | 5/2009 |
| JP | 2012-154031 A | 8/2012 |
| JP | 2012-215022 A | 11/2012 |
| JP | 2012-240518 A | 12/2012 |
| WO | 2011/152306 A1 | 12/2011 |

OTHER PUBLICATIONS

The Japanese Office Action for the corresponding Japanese application No. 2014-517918, issued on Jun. 3, 2014.

* cited by examiner

BULLDOZER

CROSS-REFERENCE TO RELATED APPLICATIONS

This application is a U.S. National stage application of International Application No. PCT/JP2013/062477, filed on Apr. 26, 2013.

BACKGROUND

1. Field of the Invention

The present invention relates to a bulldozer, which is one type of work vehicle.

2. Background Information

In Japanese Laid-Open Patent Publication 2005-113674, a bulldozer is disclosed in which the upper surface of the engine cover is tilted forward and also downward (refer to Japanese Laid-Open Patent Publication 2005-113674). With the bulldozer the workability is enhanced, because the operator is able visually to check the upper portion of the blade, i.e. of the working implement.

From the standpoint of protection of the natural environment, a work vehicle, such as a bulldozer, needs purifying of the exhaust (refer to Publication of U.S. Pat. No. 8,141,535B2). Therefore, it is nowadays practiced to mount an exhaust treatment device to a work vehicle. The term "exhaust treatment device" means, for example, a diesel particulate filter (DPF) device, a selective catalytic reduction (SCR) device, a diesel oxidation catalyst (DOC) device, or the like. Modern work vehicles need mounting, from these various exhaust treatment devices, of either two or more exhaust treatment devices of the same type, or two or more exhaust treatment devices of different types.

SUMMARY

When two or more exhaust treatment devices are disposed above the engine for the exhaust treatment devices to be housed in the engine compartment of the bulldozer described above, then it is necessary to raise the upper surface of the engine cover. When the upper surface of the engine cover is raised, then the region visible to the operator on the upper portion of the blade of the working implement becomes restricted, so that the workability is reduced.

Moreover, when these two or more exhaust treatment devices are disposed at the side of the engine, then the horizontal width of the engine compartment becomes large, and the regions visible to the operator at the side portions of the blade of the working implement become restricted. Accordingly the workability is reduced with this type of configuration as well.

An objective of the present invention is to provide a bulldozer with which deterioration of the workability is prevented, even though two or more exhaust treatment devices are housed in the engine compartment.

The bulldozer according to the first aspect of the present invention comprises a blade, an engine, a first exhaust treatment device, a second exhaust treatment device, a relay connection pipe, and an engine cover. The first exhaust treatment device and the second exhaust treatment device treat exhaust from the engine. The first exhaust treatment device is disposed in front of the engine and lower than the upper surface of the engine. The second exhaust treatment device is disposed above the first exhaust treatment device. The relay connection pipe connects the first exhaust treatment device and the second exhaust treatment device. The relay connection pipe is disposed above the first exhaust treatment device and below the second exhaust treatment device. The engine cover includes an upper surface sloping forward and downward. The engine cover covers the engine, the first exhaust treatment device, the second exhaust treatment device, and the relay connection pipe. The longitudinal directions of the first exhaust treatment device and the second exhaust treatment device extend along the vehicle lateral direction. As seen from the top of the vehicle, the second exhaust treatment device overlaps at least a part of the first exhaust treatment device. As seen from the side of the vehicle, the front edge of the first exhaust treatment device is positioned forward of the front edge of the second exhaust treatment device.

The bulldozer described above may further comprise a vehicle body frame supporting the engine. The height of an exhaust treatment assembly, which includes the first exhaust treatment device, the second exhaust treatment device, and the relay connection pipe, from the vehicle body frame may be greater than the height of the engine from the vehicle body frame. Moreover, as seen from the front of the vehicle, the second exhaust treatment device may include a part overlapping the engine. In addition thereto, as seen from the top of the vehicle, the second exhaust treatment device may include a part overlapping the engine.

As seen from the side of the vehicle, the front end of the relay connection pipe may be positioned rearward of the front edge of the first connection device. In addition thereto, as seen from the side of the vehicle, a point specified by the central axial line of the relay connection pipe may be positioned forward of a line segment that connects a point specified by the central axial line of the first exhaust treatment device and a point specified by the central axial line of the second exhaust treatment device.

The engine cover may further include a front surface along the first exhaust treatment device and the relay connection pipe, and a curved surface that smoothly connects together the upper surface and the front surface.

The bulldozer described above may further include an air cleaner disposed higher than the engine and lower than the upper surface of the engine cover.

The upper surface of the engine cover may extend along the second exhaust treatment device and the air cleaner.

The first exhaust treatment device, the relay connection pipe, the second exhaust treatment device, and the air cleaner may be disposed to surround the front and the top of the engine.

The bulldozer described above may further comprise a cab. As seen from the side of the vehicle, the straight line that joins the point of view of an operator sitting in the cab and the upper edge of the blade may be positioned higher than the engine cover.

The bulldozer described above may further include a connection pipe connecting the engine and the first exhaust treatment device, the connection pipe extending obliquely downward toward the first exhaust treatment device from a position where the connection pipe is connected to the engine. The second exhaust treatment device may be disposed above the connection pipe.

As seen from the front of the vehicle, the relay connection pipe may be overlapped over a part of the connection pipe.

The bulldozer described above may further comprise a mounting bracket, a first support bracket, and a second support bracket. The mounting bracket is attached to the engine. The first support bracket is attached to the mounting bracket, and supports the first exhaust treatment device. The second support bracket is attached to the mounting bracket, and supports the second exhaust treatment device.

The mounting bracket may include a lower attachment portion, an upper attachment portion, and a wall portion. The lower attachment portion is attached to the first support bracket. The upper attachment portion is attached to the second support bracket. The wall portion extends upward from a position rearward of the lower attachment portion to the upper attachment portion. Moreover, the upper attachment portion is positioned on the wall portion in a vertical direction.

The mounting bracket may include a first connection portion, a second connection portion, and a third connection portion. The first connection portion is connected to the lower portion of the engine. The second connection portion is connected to a first upper portion of the engine. The third connection portion is connected to a second upper portion of the engine that is different from the first upper portion thereof.

At least one of the second connection portion and the third connection portion may include a U-shaped connection portion for connection to a cylindrical component.

With the bulldozer according to an exemplary embodiment of the present invention, the first exhaust treatment device, the relay connection pipe, and the second exhaust treatment device are disposed in front of the engine, and the longitudinal direction of the first exhaust treatment device and the second exhaust treatment device extends along the vehicle lateral direction. Moreover, as seen from the side of the vehicle, the front edge of the first exhaust treatment device is positioned more forward than the front edge of the second exhaust treatment device. Due to this, it is acceptable to not greatly raise the abovementioned upper surface as a result of the fact that the first exhaust treatment device, the relay connection pipe, and the second exhaust treatment device are housed within the engine compartment, even though the engine cover has the upper surface that slopes forward and downward. As a result, the region on the upper portion of the blade of the working implement that the operator is able to check visually is extended, so that it is possible to prevent deterioration of the workability.

DETAILED DESCRIPTION OF EXEMPLARY EMBODIMENTS

Overall Structure

Figure 1:
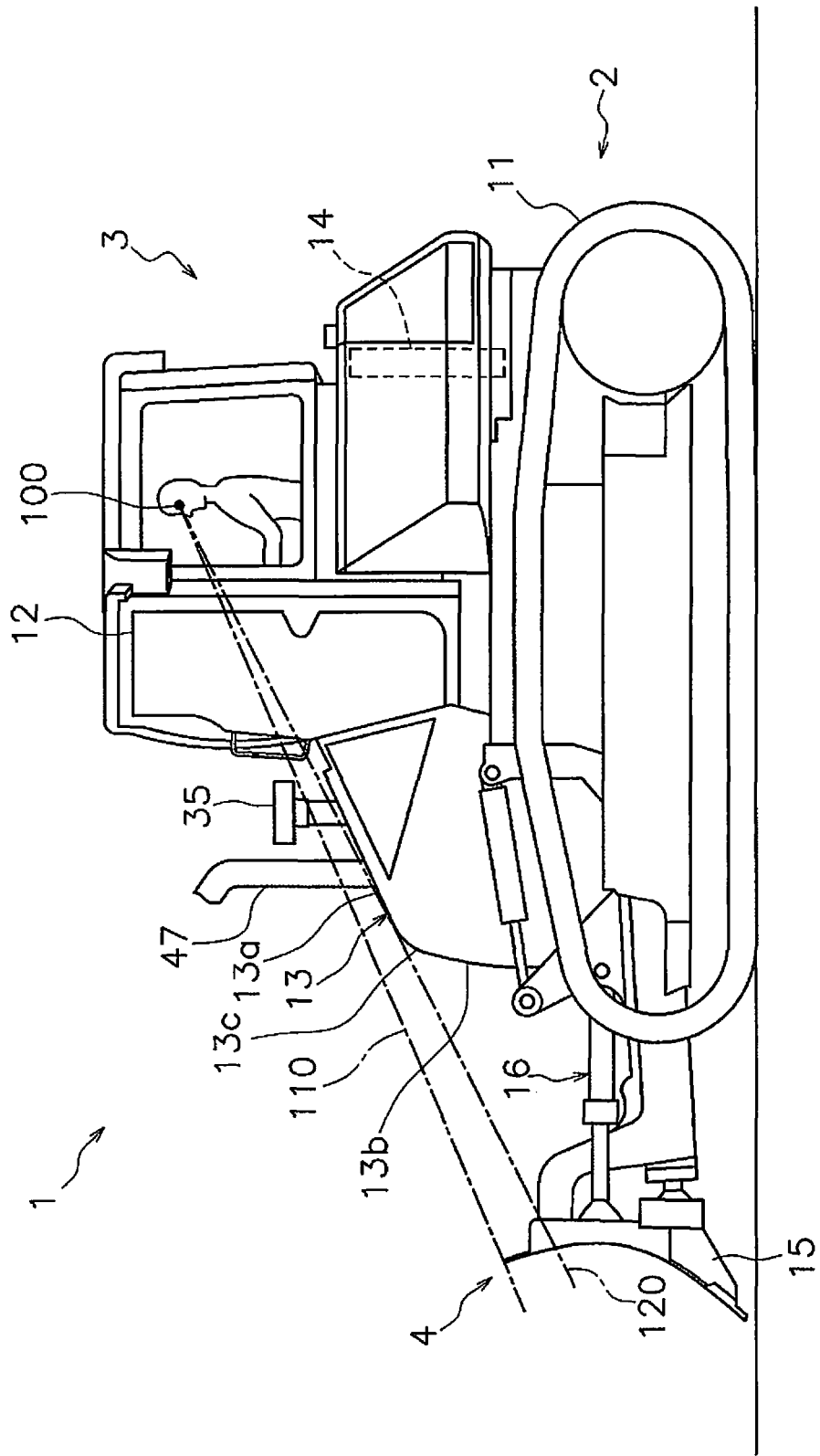
FIG. 1 is a left side view of a bulldozer according to an exemplary embodiment of the present invention.
Figure 2:
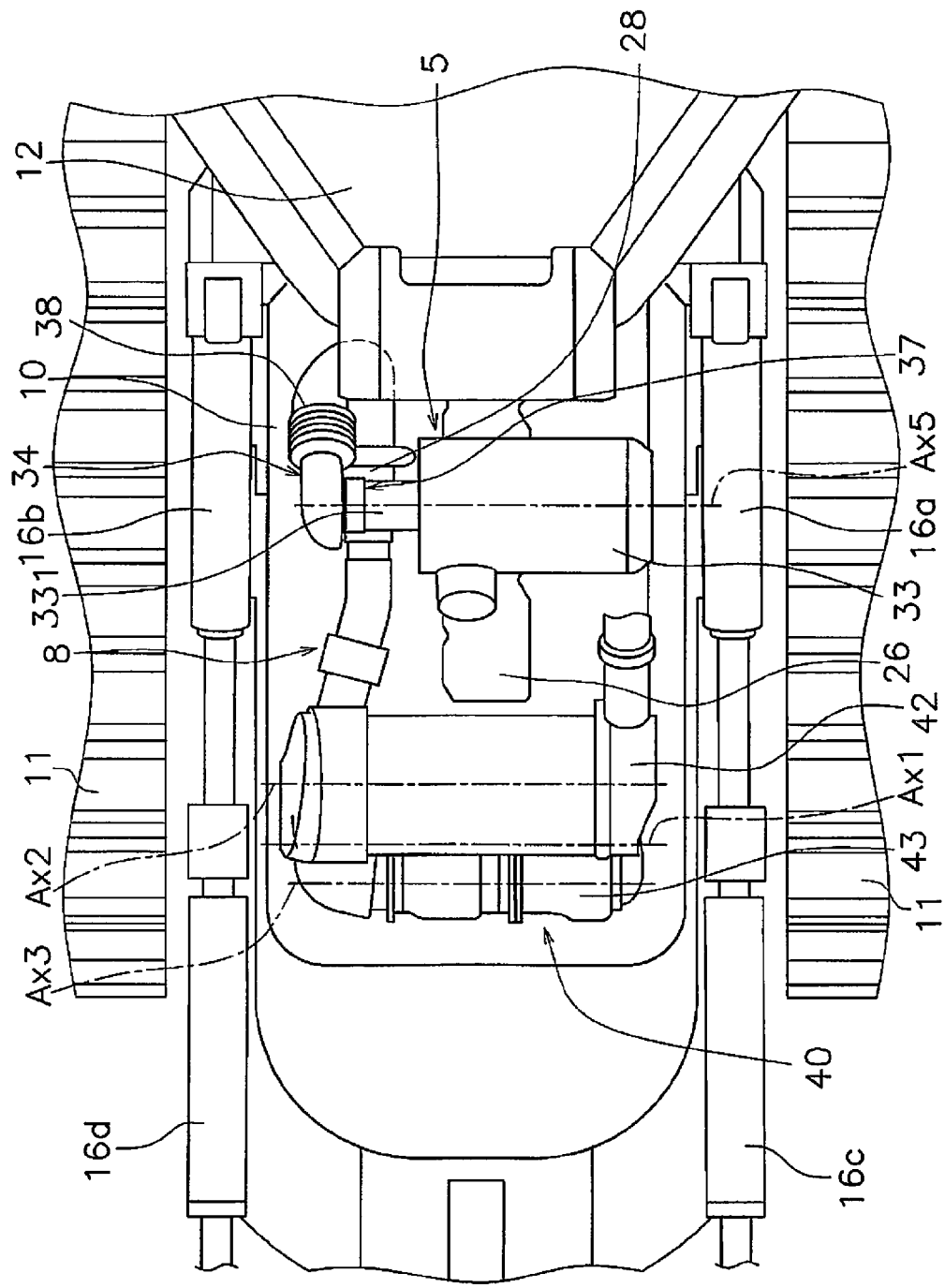
FIG. 2 is a top view illustrating a part of the bulldozer according to the exemplary embodiment of the present invention.

A left side view of a bulldozer 1 according to an exemplary embodiment of the present invention is shown in FIG. 1. A top view illustrating a part of the bulldozer according to the exemplary embodiment of the present invention is shown in FIG. 2. In FIG. 2, an engine compartment 8 is shown in a state in which an engine cover 13, which will be described hereinafter, has been removed. It should be understood that, in the following explanation, the "front/rear direction" means the front/rear direction of the bulldozer 1. To put it in other words, the front/rear direction means the front/rear direction as seen by an operator sitting in a cab (an operator compartment) 12. Moreover, the left/right direction means the left/right direction as seen by an operator sitting in the cab (the operator compartment). Furthermore, the lateral direction means the direction lateral to the vehicle, i.e. to the bulldozer 1, such that it means either one of the left direction and right direction described above.

The bulldozer 1 comprises a travelling unit 2, a main vehicle body 3, and a working implement 4. The travelling unit 2 is a device for driving the vehicle, and comprises crawler belts 11. The bulldozer 11 moves by driving the crawler belts 11.

The main vehicle body 3 comprises a vehicle body frame 10 (refer to FIG. 2), the cab 12, an engine cover 13, and a cooling device 14 (refer to FIG. 1). The engine cover 13 is disposed in front of the cab 12. An engine compartment 8 (refer to FIG. 2) in which an engine 5 is housed is positioned within the engine cover 13. The upper surface 13a of the engine cover 13 slopes upward towards the rear. The cooling device 14 is disposed behind the cab 12. It should be understood that, generally, with a bulldozer, the cooling device is disposed in front of the engine and within an engine cover that is in front of the cab. The cooling device 14 may, for example, include a radiator that cools the coolant liquid of the engine 5 and an oil cooler that cools hydraulic fluid.

The working implement 4 is provided in front of the engine cover 13. The working implement 4 comprises a blade 15 and a plurality of hydraulic cylinders 16. The blade 15 is provided so as to be capable of swinging in the vertical direction. As shown in FIG. 2, the hydraulic cylinders 16 include a first cylinder 16a, a second cylinder 16b, a third cylinder 16c, and a fourth cylinder 16d. The first cylinder 16a and the third cylinder 16c are disposed on the left side of the engine cover 13. The second cylinder 16b and the fourth cylinder 16d are disposed on the right side of the engine cover 13. The first cylinder 16a and the second cylinder 16b move the blade 15 up and down. The third cylinder 16c and the fourth cylinder 16d change the posture of the blade 15. The first cylinder 16a through the fourth cylinder 16d control the position or the posture of the blade 15.

Structures Internal to the Engine Compartment

Figure 3:
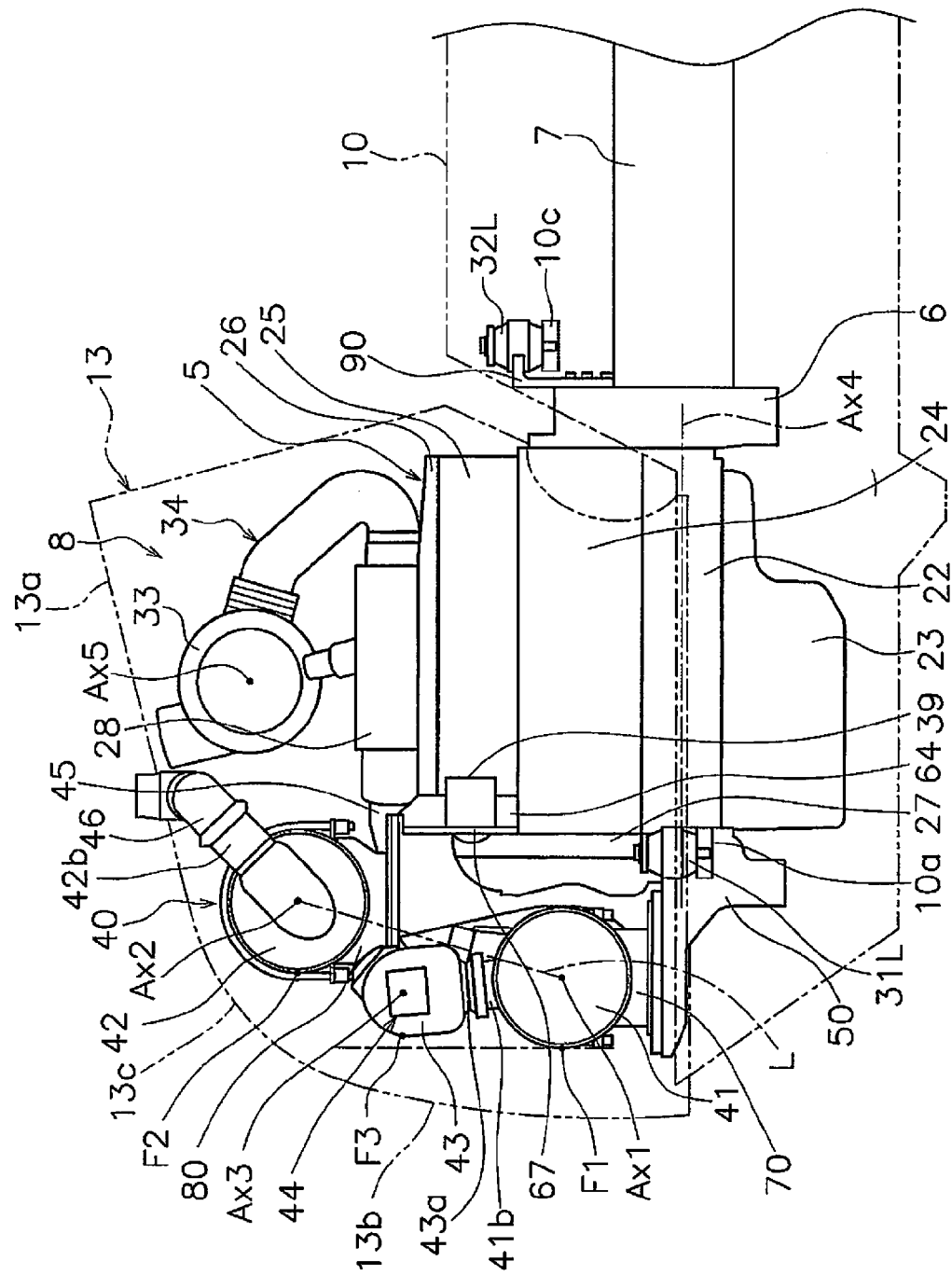
FIG. 3 is a left side view illustrating the internal structure of an engine compartment.
Figure 4:
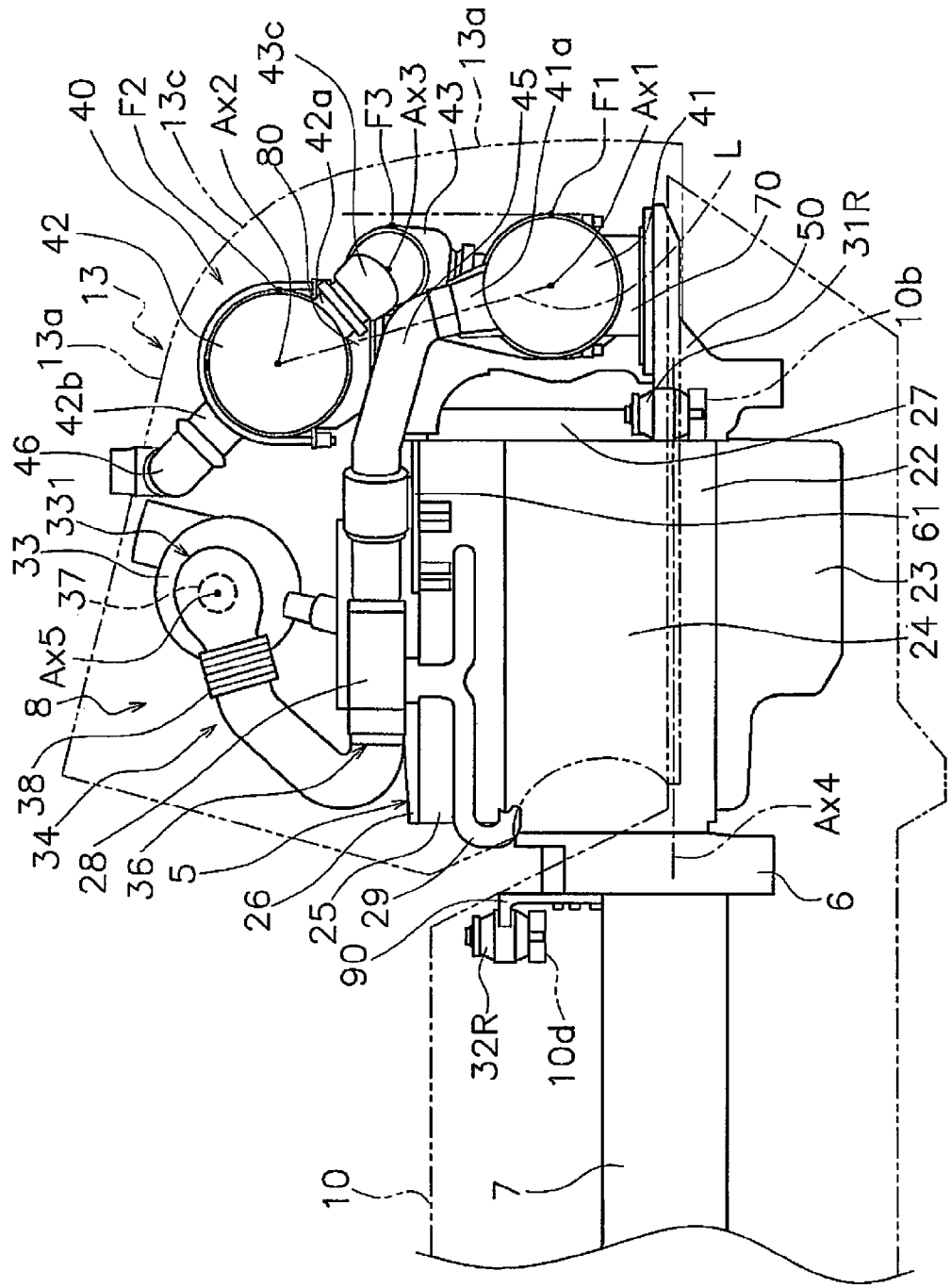
FIG. 4 is a right side view illustrating the internal structure of the engine compartment.
Figure 5:
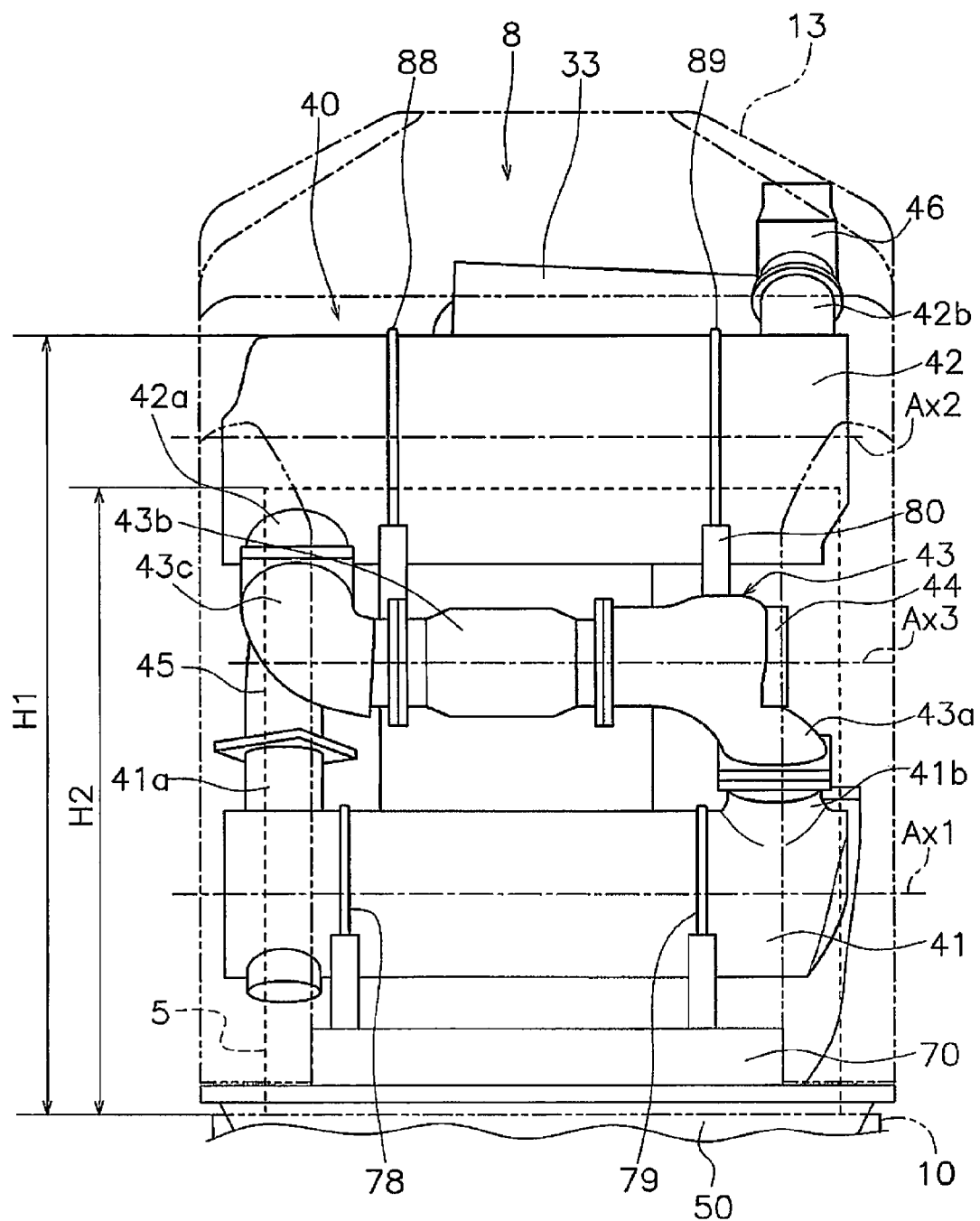
FIG. 5 is a front view illustrating the internal structure of the engine compartment.

FIG. 3 is a left side view illustrating the internal structure of the engine compartment 8 inside the engine cover 13. FIG. 4 is a right side view illustrating the internal structure of the engine compartment 8 inside the engine cover 13. The right side of FIG. 4 represents the front of the vehicle. FIG. 5 is a front view illustrating the internal structure of the engine compartment 8 inside the engine cover 13. It should be understood that, for ease of understanding, in FIGS. 3 and 4, the vehicle body frame 10 and the engine cover 13 are illustrated by chain double dashed lines. Moreover, in FIG. 5, the upper edge of the vehicle body frame 10 and the engine cover 13 that are adjacent to a mounting bracket 50, which will be described hereinafter, are illustrated by chain double dashed lines, and the schematic outline of the engine 5 is illustrated by dotted lines. Furthermore, in FIGS. 2 through 5, parts of the structures within the engine compartment 8 are appropriately omitted. As shown in FIGS. 2 to 4, the main vehicle body 3 comprises the engine 5, a flywheel housing 6 and a hydraulic pump 7. The engine 5 is disposed within the engine cover 13.

The engine 5 is a diesel engine, and the output of the engine 5 is controlled by the amount of injection of fuel from a fuel injection pump (not shown in the drawings) being adjusted. The engine 5 comprises a crankcase 22, an oil pan 23, a cylinder body 24, a cylinder head 25, and a cylinder head cover 26. Moreover, the engine 5 includes a crankshaft (not shown in the drawings). The crankshaft extends in the front and rear direction of the vehicle. To put it in other words, the engine 5 is a so-called longitudinally disposed engine, and is arranged with its longitudinal dimension along the front and rear direction of the vehicle and its short dimension along the lateral direction of the vehicle. Because the width of the vehicle with this configuration can be shortened, accordingly it is possible to secure visibility to the left and right lower ends of the blade 15, as is required for a bulldozer. Ax4 in FIGS. 3 and 4 denotes the central axial line of the crankshaft. The crankcase 22 houses the crankshaft. A cam pulley (not shown in the drawings) is disposed in front of the crankcase 22. The crankshaft is connected to the cam pulley. As shown in FIGS. 3 and 4, a belt 27 is wound around the cam pulley. The oil pan 23 is disposed below the crankcase 22. The cylinder body 24 is disposed above the crankcase 22. Moreover, the cylinder head 25 is disposed above the cylinder body 24. The cylinder head cover 26 is disposed above the cylinder head 25.

Furthermore, the engine 5 includes a supercharger 28. The supercharger 28 is connected to the cylinder head 25 via the exhaust pipe 29 of the engine 5 (refer to FIG. 4). As seen from the top of the vehicle, the supercharger 28 is arranged beside the cylinder head 25. As seen from the side of the vehicle, at least a part of the supercharger 28 is positioned above the upper surface of the engine 5, and positioned higher than the upper surface of the cylinder head cover 26.

The flywheel housing 6 is disposed behind the engine 5. The hydraulic pump 7 is disposed behind the flywheel housing 6, and is attached to the flywheel housing 6. The hydraulic pump 7 is linked to the output shaft of the engine 5 via the flywheel. The hydraulic pump 7 is driven to discharge hydraulic fluid by the drive force from the engine 5.

The main vehicle body 3 includes an air cleaner 33 and a duct 34. The air cleaner 33 and the duct 34 are positioned lower than the upper surface 13a of the engine cover 13. The air cleaner 33 is disposed over the engine 5. The air cleaner 33 is fixed to the engine cover 13. The air cleaner 33 is cylindrical in shape. The central axial line Ax5 of the air cleaner 33 shown in FIG. 2 is disposed approximately horizontally, to extend along the vehicle lateral direction. The air cleaner 33 has an intake port (not shown in the drawings) and an exhaust port 331 (refer to FIGS. 2 and 4). The intake port is connected to a head portion 35 (refer to FIG. 1) via a pipe member not shown in the figures. The head portion 35 protrudes upward from the upper surface of the engine cover 13. The exhaust port 331 is provided on the side of the air cleaner 33. The exhaust port 331 is positioned higher than the supercharger 28 described above.

The duct 34 connects the air cleaner 33 and the engine 5. The duct 34 extends downwards from the exhaust port 331 of the air cleaner 33, and has a shape that is curved towards the supercharger 28. As shown in FIG. 4, the duct 34 comprises a first connection portion 36, a second connection portion 37, and a vibration absorption portion 38. The first connection portion 36 is connected to the engine 5. Specifically, the first connection portion 36 is connected to the supercharger 28. The second connection portion 37 is connected to the air cleaner 33. The second connection portion 37 is connected to the exhaust port 331 of the air cleaner 33. In the duct 34, the vibration absorption portion 38 is positioned between the first connection portion 36 and the second connection portion 37. The vibration absorption portion 38 has the shape of a bellows.

Structure of the Exhaust Treatment Apparatus

The main vehicle body 3 comprises a first exhaust treatment device 41, a second exhaust treatment device 42, a relay connection pipe 43, a first connection pipe 45, and a second connection pipe 46. The first exhaust treatment device 41, the second exhaust treatment device 42, and the relay connection pipe 43 will be collectively referred to as an exhaust treatment assembly 40. The first connection pipe 45 connects the engine 5 and the first exhaust treatment device 41. In more detail, the first connection pipe 45 connects together the aforementioned supercharger 28 and the first exhaust treatment device 41. The second connection pipe 46 connects to the second exhaust treatment device 42, and discharges exhaust from the engine 5 that has been treated by the second exhaust treatment device 42. The second connection pipe 46 is connected to an exhaust pipe 47 which is illustrated in FIG. 1. The exhaust pipe 47 is arranged to protrude upwards from the engine cover 13.

In this exemplary embodiment, for example, the first exhaust treatment device 41 is a diesel particulate filter device, and treats exhaust from the engine 5 which is fed via the first connection pipe 45. The first exhaust treatment device 41 collects, with a filter, particulate matter (PM) included in the exhaust. The first exhaust treatment device 41 incinerates the collected particulate matter, using a heater attached to the filter.

As shown in FIGS. 3 and 4, the first exhaust treatment device 41 is disposed in front of the engine 5, and at a forefront position within the engine cover 13. The cooling device 14 is not housed inside the engine cover 13, but is disposed behind the cab 12, so that such configuration can be created. Moreover, the first exhaust treatment device 41 is disposed lower than the upper surface of the engine 5. Specifically, the first exhaust treatment device 41 is disposed lower than the upper surface of the cylinder head cover 26. Also, the first exhaust treatment device 41 is disposed higher than the bottom surface of the oil pan 23.

As shown in FIGS. 3 to 5, the first exhaust treatment device 41 has a generally cylindrical external shape. The dimension of the first exhaust treatment device 41 in the vehicle lateral direction is greater than that of the engine 5 in the vehicle lateral direction. As shown in FIG. 5, the first exhaust treatment device 41 is arranged so that its central axial line Ax1 extends along the vehicle lateral direction. The longitudinal direction of the first exhaust treatment device 41 extends along the vehicle lateral direction. Moreover, the first exhaust treatment device 41 includes a part that is overlapped over the engine 5.

As shown in FIGS. 3 to 5, the first exhaust treatment device 41 includes a first connection port 41a and a second connection port 41b. As shown in FIGS. 4 and 5, the first connection pipe 45 is connected to the first connection port 41a. As shown in FIGS. 3 and 5, the relay connection pipe 43 is connected to the second connection port 41b.

As shown in FIG. 4, the first connection port 41a protrudes obliquely upward. Specifically, the first connection port 41a protrudes upward and moreover obliquely toward the engine 5. Correspondingly, the first connection pipe 45 extends obliquely downward toward the first exhaust treatment device 41 from the position where it is connected to the engine 5. Due to this, the first exhaust treatment device 41 is disposed at a position such that it does not overlap the engine 5 in a top view. In other words, at least one of the first exhaust treatment device 41 and the second exhaust treatment device 42 is disposed at a position such that at least the one of them does not overlap the engine 5 in a top view.

As shown in FIG. 3, the second connection port 41b is inclined slightly forward from the vertical direction. Due to this, as shown in FIG. 2, in a top view, the central axial line Ax3 of a straight line portion 43b (to be described in detail hereinafter) of the relay connection pipe 43 is positioned slightly forward of the central axial line Ax1.

The relay connection pipe 43 connects the first exhaust treatment device 41 and the second exhaust treatment device 42. As shown in FIGS. 3 and 5, the external diameter of the relay connection pipe 43 is smaller than the external diameter of the first exhaust treatment device 41 and the external diameter of the second exhaust treatment device 42. One end of the relay connection pipe 43 is connected to the second connection port 41b of the first exhaust treatment device 41. The other end of the relay connection pipe 43 is connected to a third connection port 42a of the second exhaust treatment device 42. The relay connection pipe 43 is disposed in front of the engine 5, and moreover above the first exhaust treatment device 41. Furthermore, as shown in FIG. 5, the relay connection pipe 43 includes a part that is overlapped over the engine 5. As seen from the front of the vehicle, the relay connection pipe 43 is overlapped over a part of the first connection pipe 45. Moreover, as shown in FIG. 4, the relay connection pipe 43 passes through a position close to the first connection pipe 45.

As shown in FIG. 5, the relay connection pipe 43 comprises a first curved portion 43a, a straight line portion 43b, and a second curved portion 43c. The straight line portion 43b is positioned above the first exhaust treatment device 41. As shown in FIGS. 2 and 5, the straight line portion 43b is arranged so that its central axial line Ax3 extends along the vehicle lateral direction. The straight line portion 43b is arranged so that its central axial line Ax3 is parallel to the central axial line Ax1 of the first exhaust treatment device 41. To express this in another way, the longitudinal direction of the relay connection pipe 43 extends along the vehicle lateral direction. The first curved portion 43a couples together the straight line portion 43b and the second connection port 41b. The second curved portion 43c couples together the straight line portion 43b and the third connection port 42a of the second exhaust treatment device 42. An injector 44 is attached in the first curved portion 43a. The injector 44 injects a reducing agent into the interior of the relay connection pipe 43. The reducing agent may, for example, be aqueous urea.

In this embodiment, as an example, the second exhaust treatment device 42 is a selective catalytic reduction device. The second exhaust treatment device 42 treats the exhaust from the engine 5 which has been treated by the first exhaust treatment device 41. The second exhaust treatment device 42 selectively reduces nitrogen oxides (NOx).

The second exhaust treatment device 42 has a generally cylindrical external shape. As shown in FIG. 5, the second exhaust treatment device 42 is arranged so that its central axial line Ax2 extends along the vehicle lateral direction. Moreover, the second exhaust treatment device 42 is arranged so that its central axial line Ax2 is parallel to the central axial line Ax1 of the first exhaust treatment device 41. The longitudinal direction of the second exhaust treatment device 42 extends along the vehicle lateral direction. Furthermore, the second exhaust treatment device 42 has a part that overlaps the engine 5. Moreover, the height H1 of the exhaust treatment assembly 40 from the vehicle body frame 10 is greater than the height H2 of the engine 5 from the vehicle body frame 10.

As shown in FIGS. 3 and 4, the second exhaust treatment device 42 is disposed forward of the engine 5. In more detail, the second exhaust treatment device 42 is arranged so that the central axial line Ax2 of the second exhaust treatment device 42 is forward of the front end of the engine 5. And the second exhaust treatment device 42 is arranged so that the central axial line Ax2 of the second exhaust treatment device 42 is higher than the upper end of the relay connection pipe 43. The second exhaust treatment device 42 is arranged higher than the first exhaust treatment device 41 and the relay connection pipe 43. Because the relay connection pipe 43 is arranged above the first exhaust treatment device 41 and moreover below the second exhaust treatment device 42, the first exhaust treatment device 41, the relay connection pipe 43, and the second exhaust treatment device 42 are arranged in that order in the vertical direction. Moreover, the second exhaust treatment device 42 is disposed above the first connection pipe 45.

Furthermore, the second exhaust treatment device 42 is arranged to overlap a part of the first exhaust treatment device 41 in a top view. Moreover, the second exhaust treatment device 42 is arranged to overlap a part of the engine 5 in a top view. As seen from the top of the vehicle, the second exhaust treatment device 42 has a part that is overlapped over the engine 5. In more detail, as shown in FIGS. 3 and 4, the second exhaust treatment device 42 is disposed to overlap the belt 27 of the engine 5 in a top view.

Here, referring to FIGS. 3 and 4, the front edge F1 of the first exhaust treatment device 41 is positioned forward of the front edge F2 of the second exhaust treatment device 42. Moreover, a one dot chain line in FIGS. 3 and 4 indicates a straight line along the vertical direction through the front edge F1 of the first exhaust treatment device 41. According to this, as seen from the side of the vehicle, the front edge F3 of the relay connection pipe 43 is positioned rearward of the front edge F1 of the first exhaust treatment device 41. Furthermore, the line segment L that connects the point specified by the central axial line Ax1 of the first exhaust treatment device 41 and the point specified by the central axial line Ax2 of the second exhaust treatment device 42 is shown by a one dot chain line in FIGS. 3 and 4. According to this, as seen from the side of the vehicle, the point specified by the central axial line Ax3 of the relay connection pipe 43 is positioned forward of the line segment L.

As shown in FIGS. 4 and 5, the second exhaust treatment device 42 has a third connection port 42a and a fourth connection port 42b. The relay connection pipe 43 is connected to the third connection port 42a. The second connection pipe 46 is connected to the fourth connection port 42b. The second connection pipe 46 is connected to the second exhaust treatment device 42.

The third connection port 42a is tilted towards the front slightly downwards from the horizontal direction. The fourth connection port 42b protrudes obliquely upward. Specifically, the fourth connection port 42b protrudes obliquely upward and toward the engine 5. Due to this, the second connection pipe 46 protrudes upward obliquely over the engine 5. Thus, the engine cover 13 can be lowered, as compared to a configuration in which the fourth connection port 42b is directed upwards. The upper portion of the second connection pipe 46 protrudes upward from the engine cover 13.

The engine 5, the first connection pipe 45, the first exhaust treatment device 41, the relay connection pipe 43, the second exhaust treatment device 42, the second connection pipe 46, and the exhaust conduit 47 are connected in series in that order. Accordingly, the exhaust from the engine 5 passes through the first connection pipe 45 and is fed into the first exhaust treatment device 41. Particulate matter in the exhaust is mostly reduced by the first exhaust treatment device 41. Next, the exhaust passes through the relay connection pipe 43, and is fed into the second exhaust treatment device 42. NOx in the exhaust is mostly reduced by the second exhaust treatment device 42. Thereafter, the cleaned exhaust passes through the second connection pipe 46 and the exhaust pipe 47, and is discharged to the exterior.

Positional Relationship of the Exhaust Treatment Devices, the Air Cleaner, and the Engine, and the Shape of the Engine Cover As shown in FIGS. 2 through 4, the first exhaust treatment device 41, the relay connection pipe 43, the second exhaust treatment device 42, and the air cleaner 33 are arranged to surround the front and the top of the engine 5. Therefore, it is possible to arrange the first exhaust treatment device 41, the relay connection pipe 43, the second exhaust treatment device 42, and the air cleaner 33 tightly close to one another.

Next, correspondence between the positions of the exhaust treatment devices and the air cleaner 33 or the like and the shape of the engine cover 13 will be explained. As shown in FIGS. 3 through 5, the engine cover 13 covers the engine 5, the air cleaner 33, the first exhaust treatment device 41, the second exhaust treatment device 42, the relay connection pipe 43, and the injector 44. As shown in FIGS. 3 and 4, the upper surface 13a of the engine cover 13 extends along the second exhaust treatment device 42 and the air cleaner 33. The front surface 13b of the engine cover 13 extends along the first exhaust treatment device 41 and the relay connection pipe 43. The engine cover 13 also has a curved surface 13c that smoothly connects together its upper surface 13a and its front surface 13b. Due to the curved surface 13c, the region of the upper portion of the blade 15 that the operator is able to check visually is extended.

FIG. 1 illustrates the details of this situation. FIG. 1 illustrates the region of the upper portion of the blade 15 which can be visually checked from the point of view 100 of an operator who is sitting in the cab 12, as the region between straight lines 110 and 120. The point of view 100 corresponds to the position of a filament position center point (FPCP) as defined in the specification of ISO 5006. The point of view 100 is a point that is just 680 mm upward in the vertical direction from the seat index point (SIP) as defined in the specification of ISO 5006. The straight line 110 is the straight line joining the point of view 100 and the upper edge of the blade 15. The straight line 120 is the straight line passing through the point of view 100 and contacting the engine cover 13.

In FIG. 1, the straight line 120 is tangent to the curved surface 13c, and it will be understood that provision of the curved surface 13c causes extension of the region of the upper portion of the blade 15 that the operator is able to check visually. Moreover, as shown in FIG. 1, as seen from the side of the vehicle, the straight line 110 that joins the point of view 100 and the upper edge of the blade 15 is positioned higher than the engine cover 13.

Structure of the Brackets that Support the Exhaust Treatment Devices, Etc.

As shown in FIGS. 3 and 4, the main vehicle body 3 includes a mounting bracket 50, a first support bracket 70, a second support bracket 80, a rear mounting bracket 90, and dampers 31L, 31R, 32L, and 32R. The mounting bracket 50 is disposed within the engine cover 13. The mounting bracket 50 and the rear mounting bracket 90 support the engine 5 upon the vehicle body frame 10 via the dampers 31L, 31R, 32L, and 32R.

The mounting bracket 50 is attached to the engine 5, and supports the first support bracket 70 and the second support bracket 80. The first support bracket 70 is attached to the mounting bracket 50, and directly supports the first exhaust treatment device 41. The second support bracket 80 is attached to the mounting bracket 50, and directly supports the second exhaust treatment device 42.

Figure 6:
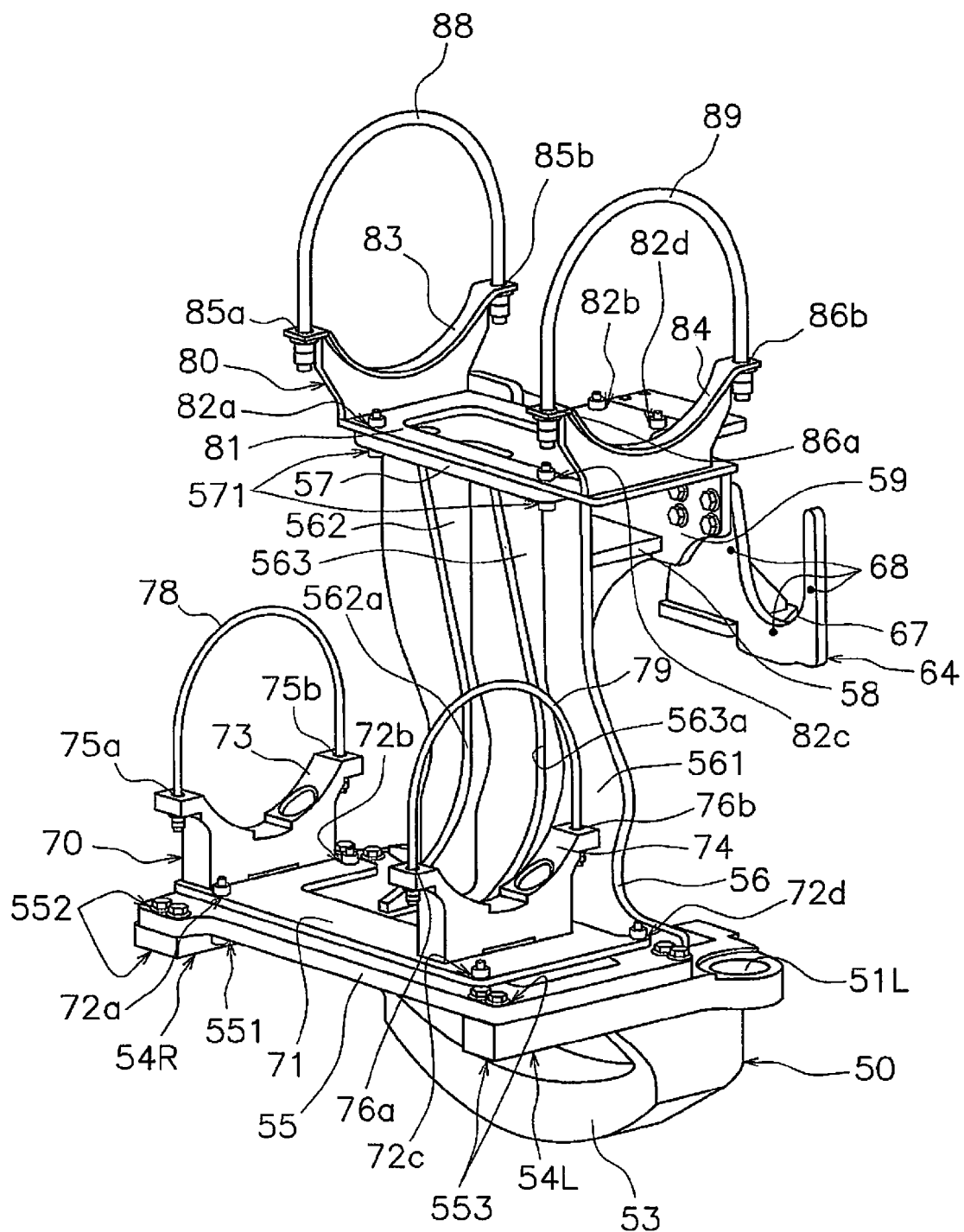
FIG. 6 is a perspective view of a mounting bracket, a first support bracket, and a second support bracket, as seen obliquely from the front.
Figure 7:
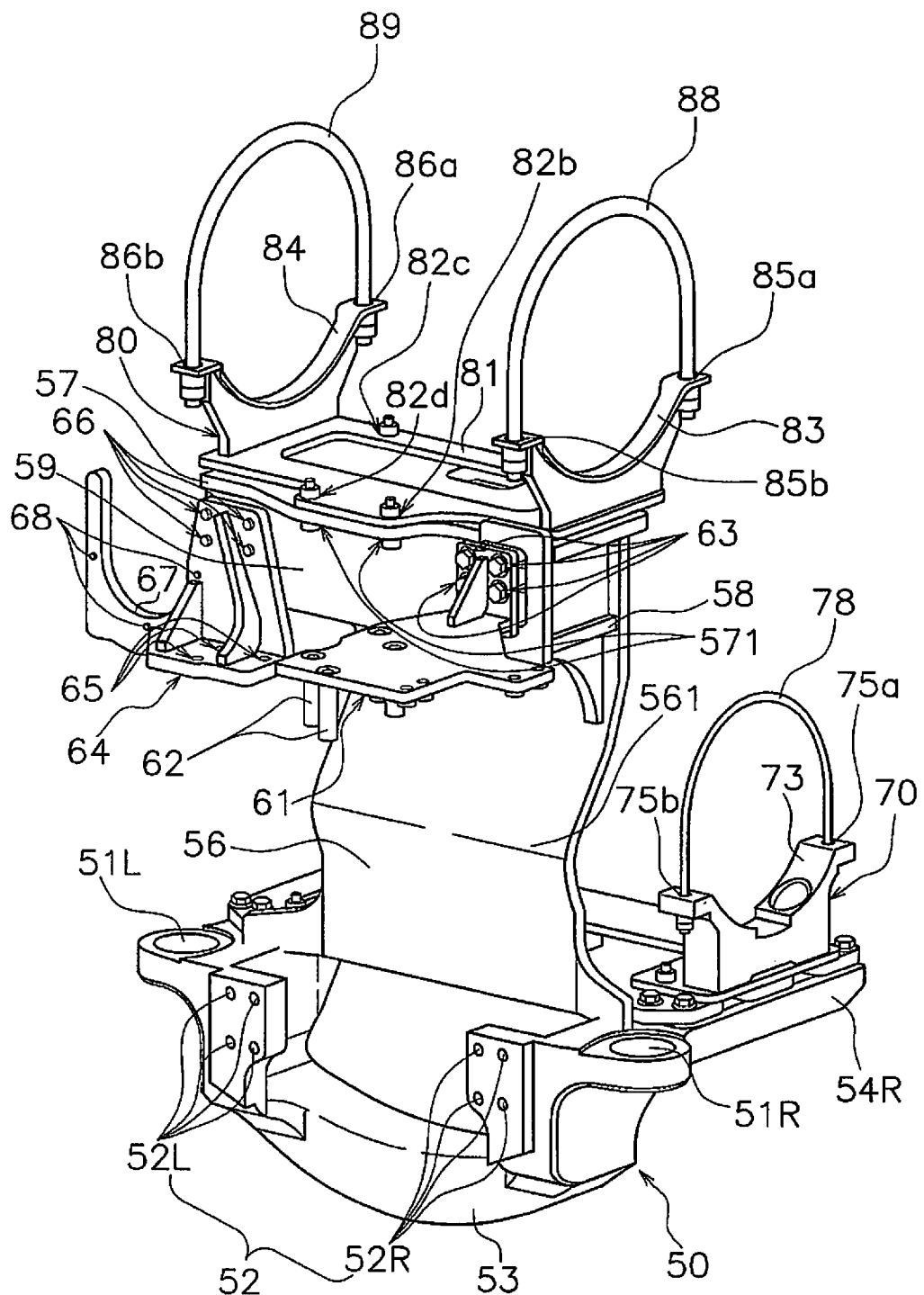
FIG. 7 is a perspective view of the mounting bracket, the first support bracket, and the second support bracket, as seen obliquely from the rear.

FIG. 6 is a perspective view of the mounting bracket 50, the first support bracket 70, and the second support bracket 80 as seen obliquely from the front. FIG. 7 is a perspective view of the mounting bracket 50, the first support bracket 70, and the second support bracket 80, as seen obliquely from the rear.

As shown in FIGS. 6 and 7, the mounting bracket 50 comprises a left fixing hole 51L, a right fixing hole 51R, a first connection portion 52, a lower link portion 53, a left front mounting portion 54L, a right front mounting portion 54R, a lower attachment portion 55, a wall portion 56, an upper attachment portion 57, a supplemental support portion 58, a rear attachment portion 59, a second connection portion 61, and a third connection portion 64. The first connection portion 52 has a left engine fixing hole 52L and a right engine fixing hole 52R.

As shown in FIG. 3, the damper 31L is attached in the left fixing hole 51L. The damper 31L is supported by the mounting bracket support portion 10a of the vehicle body frame 10. As shown in FIG. 4, the damper 31R is attached in the right fixing hole 51R. The damper 31R is supported by the mounting bracket support portion 10b of the vehicle body frame 10. The mounting bracket 50 is attached to the vehicle body frame 10 via the dampers 31L and 31R. The dampers 31L and 31R include internal elastic members made from rubber or the like. Accordingly, the mounting bracket 50 is elastically supported on the mounting bracket support portions 10a and 10b of the vehicle body frame 10 via the dampers 31L and 31R. Moreover, the left fixing hole 51L and the right fixing hole 51R are arranged as mutually separated along the vehicle lateral direction. The dampers 31L and 31R are arranged as mutually separated along the vehicle lateral direction.

As shown in FIG. 7, the left engine fixing hole 52L and the right engine fixing hole 52R are holes for inserting bolts. The engine 5 has screw holes at positions corresponding to the left engine fixing hole 52L and the right engine fixing hole 52R, into which bolts are screwed. Bolts are inserted into the left engine fixing hole 52L and the right engine fixing hole 52R and are screwed into the above screw holes. Consequently, the first connection portion 52 is attached to the front surface of the engine 5. The first connection portion 52 is connected to the lower portion of the engine 5. Accordingly, the engine 5 is elastically supported upon the vehicle body frame 10 via the mounting bracket 50 and the dampers 31L and 31R.

The left front mounting portion 54L extends from the left fixing hole 51L towards the front of the vehicle. The right front mounting portion 54R extends from the right fixing hole 51R towards the front of the vehicle. The left front mounting portion 54L and the right front mounting portion 54R support the lower attachment portion 55. The first support bracket 70 is attached to the lower attachment portion 55. As shown in FIG. 6, the lower attachment portion 55 is a planar member, and has fixing holes (551: holes corresponding to the positions of 72a through 72d) for attachment of the first support bracket 70. The right front mounting portion 54R and the lower attachment portion 55 have corresponding fixing holes for inserting bolts. In a similar manner, the left front mounting portion 54L and the lower attachment portion 55 have corresponding fixing holes 553 for inserting bolts. As shown in FIG. 6, bolts are inserted into these fixing holes 552 and 553 and are fixed with nuts. Consequently, the lower attachment portion 55 is fixed to the left front mounting portion 54L and to the right front mounting portion 54R. It should be understood that the lower attachment portion 55, the left front mounting portion 54L, and the right front mounting portion 54R may be formed as a single unitary member. Moreover, the lower attachment portion 55 may be attached to the left front mounting portion 54L and the right front mounting portion 54R by welding or the like.

The wall portion 56 extends upward to the upper attachment portion 57 from a position adjacent to and behind the lower attachment portion 55. The wall portion 56 comprises a curved portion 561 corresponding to the shape of the external periphery of the first exhaust treatment device 41, and reinforcement plates 562 and 563. The reinforcement plates 562 and 563 are flat plate members that are disposed along the vehicle front and rear direction. The reinforcement plates 562 and 563 have concave portions 562a and 563a corresponding to the shape of the external periphery of the first exhaust treatment device 41.

As shown in FIGS. 6 and 7, the upper attachment portion 57 is positioned on the wall portion 56 in a vertical direction. The upper attachment portion 57 is supported by the wall portion 56 below it. The second support bracket 80 is attached to the upper attachment portion 57. The upper attachment portion 57 is a planar member, and has fixing holes (571: holes corresponding to the positions of 82a through 82d) for attachment of the second support bracket 80. The supplemental support portion 58 is connected to the wall portion 56 at its front edge, and is connected to the rear attachment portion 59 at its rear edge. The rear attachment portion 59 is connected to the upper attachment portion 57 at its upper side, and is connected to the supplemental support portion 58 at its lower side. The second connection portion 61 and the third connection portion 64 are attached to the rear attachment portion 59.

The second connection portion 61 and the third connection portion 64 are connected to different portions of the upper side of the engine 5 (in the following, these portions will be termed the "first portion" and the "second portion"). The first portion to which the second connection portion 61 is connected is, for example, the upper surface of the engine 5 underneath the first connection pipe 45, as shown in FIG. 4. The second portion to which the third connection portion 64 is connected is, for example, the cylinder body 24 of the engine 5, as shown in FIG. 3. The second connection portion 61 and the third connection portion 64 are formed roughly in letter-L shapes.

The second connection portion 61 and the rear attachment portion 59 have corresponding fixing holes 63 for inserting bolts. It should be understood that the fixing holes 63 in the rear attachment portion 59 could also be screw holes into which bolts are screwed. As shown in FIG. 7, the second connection portion 61 is fixed to the rear attachment portion 59 by bolts and nuts, or alternatively just bolts screwed into the fixing holes 63. The third connection portion 64 has screw holes 66 into which bolts are screwed. The rear attachment portion 59 has fixing holes for inserting bolts in positions corresponding to these screw holes 66. As shown in FIG. 7, the third connection portion 64 is fixed to the rear attachment portion 59 by these bolts.

The second connection portion 61 also has protruding portions 62 through the interiors of which bolts are inserted. In the first portion of the engine 5, screw holes into which bolts are screwed are provided at positions corresponding to these protruding portions 62. As shown in FIG. 4, the second connection portion 61 is fixed to the first portion of the engine 5 by these bolts. The third connection portion 64 also has fixing holes 65 into which bolts are inserted. At positions corresponding to these fixing holes 65, screw holes into which bolts are screwed are provided in the second portion of the engine 5. As shown in FIG. 3, the third connection portion 64 is fixed to the second portion of the engine 5 by bolts.

The third connection portion 64 also has a U shaped connection portion 67 for connection to a cylindrical component. In FIG. 3, the U-shaped connection portion 67 is connected to a cylindrical component 39. The cylindrical component may, for example, be a compressor. Moreover, the third connection portion 64 may have fixing holes 68 for inserting bolts or the like for attachment to a portion (such as a flange) of the abovementioned cylindrical component whose external diameter is large. It should be understood that, instead of the above structure, the second connection portion 61 may have a U-shaped connection portion 67, or both the second connection portion 61 and the third connection portion 64 may have U-shaped connection portions 67.

In this manner, by the second connection portion 61 and third connection portion 64, the mounting bracket 50 is attached to a plurality of locations on the upper portion of the engine. Because a heavy object (the second exhaust treatment device 42) is attached to the upper portion of the mounting bracket 50, the upper portion of the mounting bracket 50 tends to largely vibrate, in particular in the front/back direction. However, because the second connection portion 61 and the third connection portion 64 fix the upper portion of the mounting bracket 50 to the upper portion of the engine 5 at a plurality of spots, the amount of vibration of the upper portion of the mounting bracket 50 in the front/back direction is reduced. Moreover, vibration of the U-shaped connection portion 67 is also reduced due to the connecting surface with the external periphery of the cylindrical component 39 in addition to the fixing of the U-shaped connection portion 67 by bolts (or by bolts and nuts). Accordingly the mounting bracket 50 is more stably fixed to the engine 5.

The first support bracket 70 comprises a first bottom portion 71, a first right support portion 73, and a first left support portion 74. The first bottom portion 71 is provided with through holes 72a, 72b, 72c, and 72d. The through holes 72a through 72d correspond to the fixing holes 551 of the lower attachment portion 55, and bolts are inserted thereinto. The bolts are inserted into the through holes 72a to 72d and into the fixing holes 551, and the bolts are fixed with nuts. Consequently, the first support bracket 70 is fixed to the lower attachment portion 55.

The first right support portion 73 is provided to protrude upward from the first bottom portion 71. The upper surface of the first right support portion 73 has a curved shape so as to be concave upward. The first exhaust treatment device 41 is cylindrical, and the upper surface of the first right support portion 73 has a shape corresponding to the cylindrical surface of the first exhaust treatment device 41. The first exhaust treatment device 41 is mounted to the first right support portion 73. Through holes 75a and 75b are provided in the front portion and in the rear portion of the first right support portion 73, respectively. A wire shaped first right fixing member 78 (refer to FIGS. 6 and 7) is passed through these through holes 75a and 75b. The first right fixing member 78 has a shape curved in a letter-U shape. The first right fixing member 78 is fixed to the first right support portion 73. Consequently, the first exhaust treatment device 41 is fixed to the first support bracket 70.

The first left support portion 74 has a shape that is left-right symmetrical with respect to the first right support portion 73. Through holes 76a and 76b are provided in the front portion and in the rear portion of the first left support portion 74, respectively. A wire shaped first left fixing member 79 (refer to FIG. 6) is passed through the through holes 76a and 76b.

The first left fixing member 79 has a shape curved in a letter-U shape. The first left fixing member 79 is fixed to the first left support portion 74. Consequently, the first exhaust treatment device 41 is fixed to the first support bracket 70.

The first exhaust treatment device 41 is attached to the first support bracket 70, and is supported on the engine 5 via the mounting bracket 50. The first exhaust treatment device 41 is supported by the engine 5 via the first support bracket 70 and the mounting bracket 50. Moreover, the mounting bracket 50 is elastically supported upon the vehicle body frame 10. Accordingly, the first exhaust treatment device 41 is elastically supported upon the vehicle body frame 10 via the first support bracket 70 and the mounting bracket 50.

The second support bracket 80 has a second bottom portion 81, a second right support portion 83, and a second left support portion 84. The second bottom portion 81 is provided with through holes 82a, 82b, 82c, and 82d. The through holes 82a through 82d correspond to the fixing holes 571 of the upper attachment portion 57, and bolts are inserted thereinto. The bolts are inserted into the through holes 82a to 82d and into the fixing holes 571, and the bolts are fixed with nuts. Consequently, the second support bracket 80 is fixed to the upper attachment portion 57.

The second right support portion 83 is provided to protrude upward from the second bottom portion 81. The upper surface of the second right support portion 83 has a curved shape to be concave upward. The second exhaust treatment device 42 is cylindrical, and the upper surface of the second right support portion 83 has a shape corresponding to the cylindrical surface of the second exhaust treatment device 42. The second exhaust treatment device 42 is mounted to the second right support portion 83. Through holes 85a and 85b are provided in the front portion and in the rear portion of the second right support portion 83, respectively. A wire shaped second right fixing member 88 (refer to FIGS. 6 and 7) is passed through the through holes 85a and 85b. The second right fixing member 88 has a shape curved in a letter-U shape. The second right fixing member 88 is fixed to the second right support portion 83. Consequently, the second exhaust treatment device 42 is fixed to the second support bracket 80.

The second left support portion 84 has a shape that is left-right symmetrical with respect to the second right support portion 83. Through holes 86a and 86b are provided in the front portion and in the rear portion of the second left support portion 84, respectively. A wire shaped second left fixing member 89 (refer to FIGS. 6 and 7) is passed through the through holes 86a and 86b. The second left fixing member 89 has a shape curved in a letter-U shape. The second left fixing member 89 is fixed to the second left support portion 84. Consequently, the second exhaust treatment device 42 is fixed to the second support bracket 80.

The second exhaust treatment device 42 is attached to the second support bracket 80, and is supported on the engine 5 via the mounting bracket 50. The second exhaust treatment device 42 is supported by the engine 5 via the second support bracket 80 and the mounting bracket 50. Moreover, the mounting bracket 50 is elastically supported upon the vehicle body frame 10. Accordingly, the second exhaust treatment device 42 is elastically supported upon the vehicle body frame 10 via the second support bracket 80 and the mounting bracket 50.

As shown in FIGS. 3 and 4, the rear mounting bracket 90 is attached to the rear surface of the flywheel housing 6. The rear mounting bracket 90 is disposed behind the mounting bracket 50. The rear mounting bracket 90 extends upward from the flywheel housing 6. At least a part of the rear mounting bracket 90 is positioned higher than the flywheel housing 6. The rear mounting bracket 90 is positioned higher than the hydraulic pump 7. The rear mounting bracket 90 is also positioned lower than the upper surface of the cylinder head cover 26. The rear mounting bracket 90 is positioned below the cab 12. It should be understood that, in the explanation of this embodiment, the described positions in the vertical direction of the mounting bracket 50 and the rear mounting bracket 90 may be referred to the centers of these brackets in the vertical direction. Alternatively, they may be referred to the positions of the bearing surface of the brackets.

As shown in FIG. 3, the damper 32L is supported by the mounting bracket support portion 10c of the vehicle body frame 10. As shown in FIG. 4, the damper 32R is supported by the mounting bracket support portion 10d of the vehicle body frame 10. The rear mounting bracket 90 is attached to the vehicle body frame 10 via the dampers 32L and 32R. The dampers 32L and 32R are arranged as mutually separated along the vehicle lateral direction. The dampers 32L and 32R include internal elastic members made from rubber or the like. Accordingly, the rear mounting bracket 90 is elastically supported on the mounting bracket support portions 10c and 10d of the vehicle body frame 10 via the dampers 32L and 32R. The engine 5 is connected to the rear mounting bracket 90 via the flywheel housing 6. Accordingly, the engine 5 is elastically supported upon the vehicle frame 10 via the rear mounting bracket 90 and the dampers 32L and 32R.

Characteristics

The bulldozer 1 according to this embodiment has the following characteristics.

In the bulldozer 1, the first exhaust treatment device 41, the relay connection pipe 43, and the second exhaust treatment device 42 are disposed in front of the engine 5, and the longitudinal direction of the first exhaust treatment device 41 and the second exhaust treatment device 42 extends along the vehicle lateral direction. Moreover, as seen from the side of the vehicle, the front edge F1 of the first exhaust treatment device 41 is positioned forward of the front edge F2 of the second exhaust device 42. Due to this, even though the upper surface 13a of the engine cover 13 is tilted forward and downward, it is possible to house the first exhaust treatment device 41, the relay connection pipe 43, and the second exhaust treatment device 42 in the engine compartment without greatly raising its upper surface 13a. As a result, it is possible to extend the region visible to the operator on the upper portion of the blade 15 of the working implement 4, so that it is possible to prevent deterioration of the workability.

As seen from the front of the vehicle, the second exhaust treatment device 42 has a part that is overlapped over the engine 5, and moreover, as seen from the top of the vehicle, the second exhaust treatment device 42 has a part that is overlapped over the engine 5. Therefore, it is possible to arrange the second exhaust treatment device 42 as near to the rear as possible, given the situation that the height H1 of the exhaust treatment assembly 40 from the vehicle body frame 10 is greater than the height H2 of the engine 5 from the vehicle body frame 10. Accordingly, it is possible further to restrain increase in the height of the upper surface 13a of the engine cover 13. As a result, the operator can visually check a broader region of the upper portion of the blade 15 of the working implement 4.

As seen from the side of the vehicle, the front edge F3 of the relay connection pipe 43 is positioned rearward of the front edge F1 of the first exhaust treatment device 41. Moreover, as seen from the side of the vehicle, the point specified by the central axial line Ax3 of the relay connection pipe 43 is positioned in front of the line segment L. Due to this, the length that the relay connection pipe 43 protrudes forward is shortened. Therefore, a large extension forward of the front surface of the engine cover 13 becomes unnecessary. As a result, it is possible to prevent increase in size of the bulldozer 1.

The engine cover 13 has the curved surface 13c that smoothly connects together its front surface 13b and its upper surface 13a. Due to this, it is possible for the operator visually to check a broader region on the upper portion of the blade 15 of the working implement 4, as compared to the case in which the front surface 13b and the upper surface 13a are directly connected together.

The air cleaner 33 is disposed above the engine 5, and moreover lower than the upper surface 13a of the engine cover 13. Accordingly it is possible to take effective advantage of the package volume by disposing the air cleaner 33 in vacant space that is within the engine compartment 8 and that has been made available by housing the first exhaust treatment device 41, the relay connection pipe 43, and the second exhaust treatment device 42 within the engine compartment 8. By packing the components at high density in the interior of the engine compartment 8, it is possible to make the engine compartment 8 more compact. As a result, it is possible for the operator visually to check a broader region upon the blade 15 of the working implement 4.

The upper surface 13a of the engine cover 13 extends along the second exhaust treatment device 42 and the air cleaner 33. The upper surface 13a of the engine cover 13 is lowered to a height that corresponds to the height of the second exhaust treatment device 42 and to the height of the air cleaner 13. As a result, it is possible for the operator visually to check a broader region upon the blade 15 of the working implement 4.

The first exhaust treatment device 41, the relay connection pipe 43, the second exhaust treatment device 42, and the air cleaner 33 are arranged to surround the front and the top of the engine 5. Due to this, it is possible to arrange the first exhaust treatment device 41, the relay connection pipe 43, the second exhaust treatment device 42, and the air cleaner 33 close together densely. Accordingly, it is possible to make the engine compartment 8 more compact. As a result, it is possible for the operator visually to check a broader region upon the blade 15 of the working implement 4.

As seen from the side of the vehicle, a straight line that joins the point of view of the operator who is sitting in the cab 12 and the upper edge of the blade 15 is positioned higher than the engine cover 13. Accordingly, the region visible to the operator on the upper portion of the blade 15 of the working implement 4 is made broader, so that it is possible to prevent deterioration of the workability.

The second exhaust treatment device 42 is disposed above the first connection pipe 45. Due to this it is possible to make the engine compartment 8 more compact, as compared to a compartment with the first connection pipe 45 provided above the second exhaust treatment device 42, or provided beside it. As a result, it is possible for the operator visually to check a broad region upon the blade 15 of the working implement 4.

As seen from the front of the vehicle, the relay connection pipe 43 is overlapped over a part of the first connection pipe 45. Accordingly, it is possible to prevent increase of the lateral width of the engine compartment 8. As a result, it is possible for the operator visually to check a broad region upon the side of the blade 15 of the working implement 4, so that it is possible to prevent deterioration of the workability.

The first support bracket 70 that supports the first exhaust treatment device 41 and the second support bracket 80 that supports the second exhaust treatment device 42 are attached to the mounting bracket 50. Due to this, the tasks of fixing the first exhaust treatment device 41 and the second exhaust treatment device 42, or the tasks of taking them off, can be performed with each of the support brackets attached to the corresponding exhaust treatment device. Accordingly the tasks of fitting and removal become easy.

The mounting bracket 50 includes the lower attachment portion 55, the upper attachment portion 57, and the wall portion 56 that extends upwards from a position behind the lower attachment portion 55 to the upper attachment portion 57. Due to this, it is possible to arrange the first exhaust treatment device 41 and the second exhaust treatment device 42 in sequence in the vertical direction so that increase in the size of the engine compartment 8 can be restrained. Moreover, since the upper attachment portion 57 is supported by the wall portion 56 from below. Accordingly, even though the thickness of the wall portion 56 becomes thin partway along (in the vicinity of the curved portion 561), the second exhaust treatment device 42 is supported in a stable manner by the mounting bracket 50.

The mounting bracket 50 is connected to the lower portion of the engine 5 by the first connection portion 52. Moreover, the mounting bracket 50 is connected to the upper portion of the engine 5 at least at two locations: at the second connection portion 61, and at the third connection portion 64. Accordingly the mounting bracket 50 is fixed to the engine 5 in a stable manner. Due to this, it is possible to avoid imposition of excessive load upon the first connection portion 45, which is caused by the difference between vibrations of the first exhaust treatment device 41 and the second exhaust treatment device 42 and that of the engine 5.

At least one of the second connection portion 61 and the third connection portion 64 includes the U shaped connection portion 67 for connection to a cylindrical component. The mounting bracket 50 is fixed more stably to the engine 5, because vibration of the U-shaped connection portion 67 is suppressed by the connecting surface at the external periphery of the cylindrical component as well as the fixation by bolts (or by bolts and nuts). Due to this, it is possible to avoid imposition of excessive load upon the first connection portion 45, which is caused by the difference between vibrations of the first exhaust treatment device 41 and the second exhaust treatment device 42 and that of the engine 5.

Modifications

While an exemplary embodiment of the present invention has been explained above, the present invention is not limited to the above described exemplary embodiment and various modifications are possible within the gist of the present invention.

The shapes of the mounting bracket 50 and the rear mounting bracket 90 are not limited to the aforementioned shapes and they could be varied as appropriate. Moreover, the shapes of the first support bracket 70 and the second support bracket 80 are not limited to the aforementioned shapes described above and they could be varied as appropriate. Yet further, the mounting bracket 50, the first support bracket 70, and the second support bracket do not need to be separate components and they may be formed as a single integrated unit.

In the exemplary embodiment described above, it is described that the first exhaust treatment device 41 is a diesel particulate filter device, while the second exhaust treatment device 42 is a selective catalytic reduction device. However, the first exhaust treatment device 41 may be a selective catalytic reduction device, while the second exhaust treatment device 42 may be a diesel particulate filter device. But, since it is desirable for the exhaust from the engine to be fed into the diesel particulate filter device first, in this case, the sequence and the orientations of the pipes that connect to the first exhaust treatment device 41 and the second exhaust treatment device 42 should be opposite.

It should be understood that the first exhaust treatment device 41 may not be a diesel particulate filter device, but may be a diesel oxidation catalyst (DoC).

The first exhaust treatment device 41 and the second exhaust treatment device 42 are not limited to being cylindrical or the like; they could have other shapes, for example they could be shaped as elliptic cylinders or rectangular parallelepipeds or the like. In this case, the shapes of the support portions (73, 74) that support the first exhaust treatment device 41 and the shapes of the support portions (83, 84) that support the second exhaust treatment device 42 would respectively correspond to the shape of the side surfaces of the first exhaust treatment device 41 and the shape of the side surfaces of the second exhaust treatment device 42.

There may be any number of dampers 31L, 31R, 32L, and 32R. However, it is desirable for the same number of dampers to be provided on the left side and on the right side.

Each of the number of the support portions (73, 74) that support the first exhaust treatment device 41, the number of the support portions (83, 84) that support the second exhaust treatment device 42, the number of the fixing members (78, 79) that fix the first exhaust treatment device 41, and the number of the fixing members (88, 89) that fix the second exhaust treatment device 42, is not limited to two, and it may be one or more than three.

The numbers and the positions of the holes for attaching the components that the mounting bracket 50, the first support bracket 70, and the second support bracket 80 include, may be varied as appropriate. Moreover, the method of fixing shown in the exemplary embodiment is only given as an example, and it would also be possible to attach the component to the mounting bracket 50, the first support bracket 70, and the second support bracket 80 by some other method of fixing. For example, the fixing means may be by hooks, or by welding or the like.

According to exemplary embodiments of the present invention, it is possible to provide a bulldozer with which deterioration of the workability is prevented, even though a diesel particulate filter device and a selective catalytic reduction device are both housed in the engine compartment.

The invention claimed is:

1. A bulldozer, comprising:
 a blade;
 an engine;
 a first exhaust treatment device treating exhaust from the engine, the first exhaust treatment device being disposed in front of the engine and lower than an upper surface of the engine;
 a second exhaust treatment device treating exhaust from the engine, the second exhaust treatment device being disposed above the first exhaust treatment device;
 a relay connection pipe connecting the first exhaust treatment device and the second exhaust treatment device, the relay connection pipe being disposed above the first exhaust treatment device and below the second exhaust treatment device; and
 an engine cover covering the engine, the first exhaust treatment device, the second exhaust treatment device, and the relay connection pipe, the engine cover including an upper surface sloping forward and downward,
wherein
 the longitudinal directions of the first exhaust treatment device and the second exhaust treatment device extend along the vehicle lateral direction;
 as seen from the top of the vehicle, the second exhaust treatment device overlaps at least a part of the first exhaust treatment device; and
 as seen from the side of the vehicle, a front edge of the first exhaust treatment device is positioned forward of a front edge of the second exhaust treatment device.

2. A bulldozer according to claim 1, further comprising
a vehicle body frame supporting the engine, wherein
 the height of an exhaust treatment assembly from the vehicle body frame is greater than the height of the engine from the vehicle body frame, the exhaust treatment assembly including the first exhaust treatment device, the second exhaust treatment device, and the relay connection pipe;
 as seen from the front of the vehicle, the second exhaust treatment device includes a part overlapping the engine; and
 as seen from the top of the vehicle, the second exhaust treatment device includes a part overlapping the engine.

3. A bulldozer according to claim 1, wherein,
 as seen from the side of the vehicle, a front end of the relay connection pipe is positioned rearward of a front edge of a first connection device, and
 a point specified by the central axial line of the relay connection pipe is positioned forward of a line segment that connects a point specified by the central axial line of the first exhaust treatment device and a point specified by the central axial line of the second exhaust treatment device.

4. A bulldozer according to claim 1, wherein the engine cover further includes
 a front surface along the first exhaust treatment device and the relay connection pipe, and
 a curved surface that smoothly connects together the upper surface and the front surface.

5. A bulldozer according to claim 1, further comprising
an air cleaner disposed higher than the engine and lower than the upper surface of the engine cover.

6. A bulldozer according to claim 5, wherein
the upper surface of the engine cover extends along the second exhaust treatment device and the air cleaner.

7. A bulldozer according to claim 5, wherein
the first exhaust treatment device, the relay connection pipe, the second exhaust treatment device, and the air cleaner are disposed to surround the front and the top of the engine.

8. A bulldozer according to claim 1, further comprising a cab; wherein,
 as seen from the side of the vehicle, the straight line that joins the point of view of an operator sitting in the cab and an upper edge of the blade is positioned higher than the engine cover.

9. A bulldozer according to claim 1, further comprising
a connection pipe connecting the engine and the first exhaust treatment device, the connection pipe extending obliquely downward toward the first exhaust treatment device from a position where the connection pipe is connected to the engine;
wherein the second exhaust treatment device is disposed above the connection pipe.

10. A bulldozer according to claim 9, wherein,
as seen from the front of the vehicle, the relay connection pipe is overlapped over a part of the connection pipe.

11. A bulldozer according to claim 1, further comprising
a mounting bracket attached to the engine;
a first support bracket supporting the first exhaust treatment device, the first support bracket being attached to the mounting bracket; and
a second support bracket supporting the second exhaust treatment device, the second support bracket being attached to the mounting bracket.

12. A bulldozer according to claim 11, wherein the mounting bracket comprises
a lower attachment portion attached to the first support bracket;
an upper attachment portion attached to the second support bracket; and
a wall portion that extends upward from a position rearward of the lower attachment portion to the upper attachment portion;
wherein the upper attachment portion is positioned on the wall portion in a vertical direction.

13. A bulldozer according to claim 11, wherein the mounting bracket comprises
a first connection portion connected to the lower portion of the engine;
a second connection portion connected to a first upper portion of the engine; and
a third connection portion connected to a second upper portion of the engine which is different from the first upper portion thereof.

14. A bulldozer according to claim 13, wherein
at least one of the second connection portion and the third connection portion comprises a U-shaped connection portion for connection to a cylindrical component.

* * * * *